US011419336B2

United States Patent
Fabri et al.

(10) Patent No.: US 11,419,336 B2
(45) Date of Patent: Aug. 23, 2022

(54) HERBICIDAL COMBINATION

(71) Applicant: UPL LTD, Haldia (IN)

(72) Inventors: Carlos Eduardo Fabri, Sao Paulo (BR); Rajnikant Devidas Shroff, Mumbai (IN); Ajit Kumar, Mumbai (IN); Jaidev Rajnikant Shroff, Dubai (IN); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 0 days.

(21) Appl. No.: 16/482,519

(22) PCT Filed: Jan. 30, 2018

(86) PCT No.: PCT/IB2018/050547
§ 371 (c)(1),
(2) Date: Jul. 31, 2019

(87) PCT Pub. No.: WO2018/142273
PCT Pub. Date: Aug. 9, 2018

(65) Prior Publication Data
US 2020/0045964 A1  Feb. 13, 2020

(30) Foreign Application Priority Data

Jan. 31, 2017 (IN) .............. 201731003641
Nov. 29, 2017 (IN) .............. 201731042834

(51) Int. Cl.
A01N 43/54 (2006.01)
A01N 33/18 (2006.01)
A01N 41/06 (2006.01)
A01N 43/653 (2006.01)
A01N 43/66 (2006.01)
A01N 43/707 (2006.01)

(52) U.S. Cl.
CPC .............. A01N 43/54 (2013.01); A01N 33/18 (2013.01); A01N 41/06 (2013.01); A01N 43/653 (2013.01); A01N 43/66 (2013.01); A01N 43/707 (2013.01)

(58) Field of Classification Search
CPC ........ A01N 43/54; A01N 33/18; A01N 41/06; A01N 43/653; A01N 43/66; A01N 43/707
See application file for complete search history.

(56) References Cited

U.S. PATENT DOCUMENTS

| 8,653,002 | B2 | 2/2014 | Krapp et al. | |
| 2013/0244876 | A1 | 9/2013 | Jabs et al. | |
| 2016/0213000 | A1 | 7/2016 | Etcheverry et al. | |
| 2016/0286802 | A1* | 10/2016 | Koschnick | A01N 43/84 |
| 2018/0007901 | A1* | 1/2018 | Massa | A01N 43/84 |
| 2018/0064111 | A1* | 3/2018 | Massa | A01N 41/06 |

FOREIGN PATENT DOCUMENTS

| WO | 2009141367 | | 11/2009 |
| WO | 2011082958 | | 7/2011 |
| WO | 2012177860 | A1 | 12/2012 |
| WO | 2016113334 | A1 | 7/2016 |
| WO | 2016116531 | A1 | 7/2016 |
| WO | 2016156241 | A1 | 10/2016 |

OTHER PUBLICATIONS

Hijano et al, Herbicide selectivity in alfalfa crops, Planta Daninha, Vicosa-MG, v.31, n.4, p. 903-918 (Year: 2013).*
International Search Report for International Application No. PCT/IB2018/050547; International filing date Jan. 30, 2018; dated Apr. 16, 2018; 6 pages.
Singh et al.; "Tank Mix of Saflufenacil with Glyphosate and Pendimenthalin for Broad-spectrum Weed Control in Florida Citrus"; Hort Technology; 21(5); pp. 606-615; (2011).
Written Opinion of the International Searching Authority for International Application No. PCT/IB2018/050547; International filing date: Jan. 30, 2018; dated Apr. 16, 2018; 5 pages.
Colby, S.R., "Calculating Synergistic and Antagonistic Responses of Herbicide Combinations", WEEDS, vol. 15, No. 1 (Jan. 1967); pp. 20-22.

* cited by examiner

Primary Examiner — Mina Haghighatian
(74) Attorney, Agent, or Firm — Cantor Colburn LLP

(57) ABSTRACT

The present invention provides a herbicidal combination comprising Saflufencacil in combination at least two herbicides. The first herbicide may be selected from a triazine herbicide, triazinone herbicide, triazole herbicide, triazolone herbicide, or triazolopyrimidine herbicide, and the second herbicide may be at least one dinitroaniline herbicide.

3 Claims, No Drawings

HERBICIDAL COMBINATION

CROSS REFERENCE TO RELATED APPLICATIONS

This application is a National Stage application of PCT/IB2018/050547 filed on Jan. 30, 2018, which claims priority to Application No. IN 2017/31003641 filed on Jan. 31, 2017; and Application No. IN 2017/31042834 filed on Nov. 29, 2017, all of which are incorporated by reference in their entirety herein.

TECHNICAL FIELD

The present invention relates to combinations of herbicides for controlling harmful undesirable plants. The present invention more specifically relates to a synergistic combination of herbicides.

BACKGROUND AND PRIOR ART

Weeds are undesirable plants that can severely damage yield in crops. Farmers usually control these plants at the pre-plant stage as well as after sowing. Modern herbicides are used to either control or suppress these undesirable plants so as to allow sown crops a greater share of nutrient.

Current practices include combining herbicides with varied modes of action, which allows for broader spectrum of control and resistance management. However, the combinations currently known are not sufficient to control the resistant and persistent weeds. Growers Increasingly face complex weed situations that may not be controlled with just one herbicide.

PPO inhibitor herbicides are mostly used to injure broadleaf plants and have some activity on grasses. They have limited translocation in plants and are used to control weeds in field crops, vegetables, tree fruits and vines, small fruits, nurseries, lawns, etc. PPO Inhibitors usually burn plant tissues within hours or days of exposure, making them an excellent tool to control unwanted weeds both pre and post emergence. Saflufenacil is PPO inhibitor herbicide that is used for both pre-plant burndown as well as post emergent control of weeds. Combination of Saflufenacil with other broad spectrum herbicides are known from WO2016113334 (Massa et. al) or US2013244876 (Thorsten et. al).

Microtubule Inhibitors are generally applied to control annual grasses and some broadleaf weeds in several crops and turf grass. Absorbed by both roots and shoots, these herbicides cause cell damage and are an excellent tool to control pre-emergent weeds. Pendimethalin is a microtubule inhibitor herbicide, which is used both pre and post emergent for control, of broadleaf and annual grasses. Pendimethalin is known to be used in combination such as those known from WO201217.7860 (Mann et. al.)

Photosynthetic Inhibitors control many broadleaf and some grass weeds by interfering in the electron transport chain and indirectly membrane leakage and cell damage. These herbicides are excellent tools for controlling pre-emergent weeds. Metribuzin is a photosynthesis inhibitor herbicide that is used for both pre and post emergent control of broadleaf and annual grasses. Metribuzin is known to be combined with other herbicides such as the combinations known from WO2011082958 Hubert et al).

Combinations of herbicides are used to control a broader range of weeds. However, the combination of herbicides may not always result in the desired effect. Combination of herbicides may lead to an additive effect or an antagonistic effect. It may also result in phytotoxicity to the crops making it an undesirable combination. Agronomists must therefore carefully select the herbicides that can be combined to offer a synergistic effect that would control weeds while having no phytotoxic effect on the crop, and reduce the chances of development of herbicide resistant weeds.

There is therefore a need in the art for combinations that have advantageous properties such as a herbicidal combination that is synergistic, helps in resistance management, reduces dosage of herbicides used thus causing minimal damage to the environment, and a herbicidal combination that has excellent residual effects.

Embodiments of the present invention may therefore ameliorate one or more of the above mentioned problems:

SUMMARY OF THE INVENTION

Therefore, in one aspect, the present invention may provide a synergistic combination comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

Another aspect of the present invention may provide a method of controlling weeds at a locus, said method comprising applying to the locus a combination comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

Another aspect of the present invention may provide a synergistic composition comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

Yet another aspect of the present invention may provide a method of increasing yield in a crop by application of a synergistic combination comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

Another aspect of the present invention may provide a method of improving the plant health, said method comprising application at the locus of the plant a combination comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

DETAILED DESCRIPTION OF THE INVENTION

The term herbicide, as used herein, shall mean an active ingredient that kills, controls or otherwise adversely modifies the growth of plants. As used herein, a herbicidally effective or vegetation controlling amount is an amount of active ingredient that causes a "herbicidal effect," i.e., an adversely modifying effect and includes deviations from natural development, killing, regulation, desiccation, retardation. The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control, of weeds is desired. The locus includes the vicinity of desired crop plants wherein the weed infestation has either emerged or is yet to emerge. The term crop shall include a multitude of desired crop plants or an individual crop plant growing at a locus.

Protection of planted crops from undesirable plants which inhibit crop growth is a perpetual struggle for all farmers. Herbicides have been used to control growth of such plants. There are many herbicides and combinations known in the art. There, however, still remains a need for improved herbicidal combinations that can effectively control weeds, thereby, improving yield and plant health; With reduced phytotoxicity.

Saflufenacil is a PPO inhibitor herbicide, its chemical name is N'-{2-chloro-4-fluoro-5-[1,2,3,6-tetrahydro-3-methyl-2,6-dioxo-4-(trifluoromethyl)pyrimidin-1-yl]benzoyl}-N-isopropyl-N-methylsulfamide and has the structure:

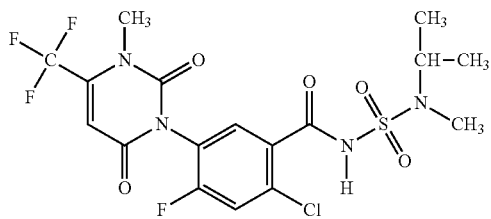 [SMILES: CC(C)N(C)S(=O)(=O)NC(=O)c1cc(-n2c(=O)cc(C(F)(F)F)n(C)c2=O)c(F)cc1Cl]

One example of a dinitrolaniline herbicide is pendimethalin. Pendimethalin is a microtubule inhibitor herbicide, its chemical name is N-(1-ethylpropyl)-2,6-dinitro-3,4-xylidine and has the chemical structure:

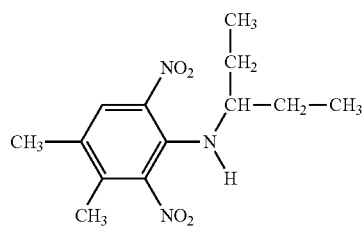 [SMILES: CCC(CC)Nc1c([N+](=O)[O-])cc(C)c(C)c1[N+](=O)[O-]]

One example of a second herbicide according to the present invention is metribuzin. Metribuzin is a photosynthetic Inhibitor herbicide. Its chemical name is 4-amino-6-tert-butyl-4,5-dihydro-3-methylthio-1,2,4-triazin-5-one, and has the structure:

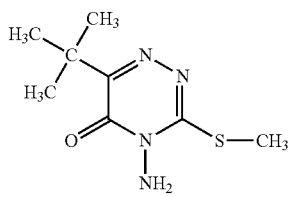

Saflufenacil alone is usually effective for control of early season broadleaf weed control. Saflufenacil shows a reduced efficacy in weed control beyond 30 days after treatment. It showed better efficacy when tank mixed with pendimethalin. However, this combination still did not give the desired weed control. (Singh et. al HortTechnology October 2011 vol. 21 no. 5 606-615). There is therefore, a need in the art, for an herbicidal combination which is of a broader spectrum, which can give a better control of weeds at a tower use rates, which gives good residual control.

Surprisingly, it has been found by the present inventors that the combination of herbicides belonging to classes of PPO inhibitors, microtubule inhibitor and photosystem II inhibitors results in a synergistic control of undesirable plants, at the locus of the plant.

Thus an embodiment of the present invention may provide a synergistic combination comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

In another aspect, the present invention provides a method of controlling weeds at a locus by applying the combination of the present Invention to the locus. Thus, in this aspect, the present invention may provide a method of controlling weeds at a locus, said method comprising applying to the locus a combination comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

In another aspect, the present invention provides a composition comprising the combinations of the present invention. Therefore, in this aspect, the present invention may provide a synergistic composition comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroanitine herbicide.

In another aspect, the present invention provides a method for increasing yield in a crop by using the combinations of the present invention. Therefore, in this aspect, the present invention may provide a method of increasing yield in a crop by application of a synergistic combination comprising:
(a) saflufenacil;
(b) at least one herbicide selected from a triazine herbicide, triazinone herbicide, triazole herbicide, triazolone herbicide, or triazolopyrimidine herbicide; and
(c) at least another dinitroaniline herbicide.

In another aspect, the present invention may provide a method of improving the plant health using the combinations of the present invention. Therefore, in this aspect, the present invention may provide a method of improving the plant health, said method comprising application at the locus of the plant a combination comprising:
(a) saflufenacil;
(b) at least one herbicide selected from a triazine herbicide, triazinone herbicide, triazole herbicide, triazolone herbicide, or triazolopyrimidine herbicide; and
(c) at feast another dinitroaniline herbicide.

Each of the aspect described above may have one or more embodiments.

In each of these embodiments, apart from saflufenacil, the embodiments may include a first and a second herbicide as described herein. As used herein, the term first herbicides includes at least one herbicide selected from a triazine herbicide, triazinone herbicide, triazole herbicide, triazolone herbicide, or triazolopyrimidine herbicide, and the term second herbicide includes at least one dinitroaniline herbicide.

Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

In an embodiment, the first herbicides is selected from a triazine herbicide, a triazinone herbicide, a triazole herbicide, a triazolone herbicide, or a triazolopyrimidine herbicide.

In an embodiment, the triazine herbicide is selected from dipropetryn, fucoajing, trihydroxytriazine, atrazine, chlorazine, cyanazine, cyprazine, eglinazine, ipazine, mesoprazine, procyazine, proglinazine, propazine, sebuthylazine, simazine, terbuthylazine, trietazine, indaziflam, triaziflam, atraton, methometon, prometon, secbumeton, simeton, terbumeton, ametryn, aziprotryne, cyanatryn, desmetryn, dimethametryn, methoprotryne, prometryn, simetryn, and terbutryn.

In an embodiment, the triazine herbicide is atrazine.

In an embodiment, the triazinone herbicide is selected from ametridione, amibuzin, ethiozin, hexazinone, isomethiozin, metamitron, metribuzin and trifludimoxazin.

In an embodiment, the triazinone herbicide is selected from hexazinone, metamitron and metribuzin.

In an embodiment, the triazole herbicide is selected from amitrole, cafenstrole, epronaz and flupoxam.

In an embodiment, the triazolone herbicide is selected from amicarbazone, bencarbazone, carfentrazone, flucarbazone, ipfencarbazone, propoxycarbazone, sulfentrazone and thiencarbazone.

In an embodiment, the triazolone herbicide is selected from carfentrazone, flucarbazone and sulfentrazone.

In an embodiment, the triazolone herbicide is sulfentrazone.

In an embodiment, the triazolopyrimidine herbicide is selected from cloransulam, diclosulam, florasulam, flumetsulam, metosulam, penoxsulam and pyroxsulam.

In an embodiment, the triazolopyrimidine herbicide is penoxsulam.

In a preferred embodiment, the combinations and methods of the present invention comprise saflufenacil, a first herbicide and a second herbicide.

In a preferred embodiment, the first herbicide is selected from triazine, hexazinone, metamitron, metribuzin, carfentrazone, flucarbazone, sulfentrazone and penoxsulam.

In an embodiment, the second herbicide is a dinitroaniline herbicide.

In an embodiment, the dinitroaniline herbicide may be selected from benfluralin, butralin, chlornidine, dinitramine, dipropalin, ethalfluralin, fluchloralin, isopropalin, nitralin, oryzalin, pendimethalin, prodiamine, profluralin and trifluralin.

In an embodiment, the dinitroaniline herbicide may be selected from oryzalin and pendimethalin.

In an embodiment, the present invention provides preferred combinations, compositions and methods thereof. The methods of the invention include a method of controlling weeds at a locus by applying to the locus the combination or the composition, a method of increasing yield in a crop by application of the combination or composition, or a method of improving the plant health by application at the locus of the plant the combination or the composition. The embodiments described herein describe the preferred embodiments of all these possible combinations, compositions and methods of the invention.

Therefore, an embodiment of the present invention provides a combination and method comprising saflufenacil; a first herbicide selected from triazine, hexazinone, metamitron, metribuzin, carfentrazone, flucarbazone, sulfentrazone and penoxsulam; and a second herbicide selected from oryzalin and pendimethalin.

An embodiment of the present invention provides a combination and method comprising saflufenacil, triazine, and oryzalin.

An embodiment of the present invention provides a combination and method comprising saflufenacil, triazine, and pendimethalin.

An embodiment of the present Invention provides a combination and method comprising saflufenacil, hexazinone, and oryzalin.

An embodiment of the present invention provides a combination and method comprising saflufenacil, hexazinone, and pendimethalin.

An embodiment of the present invention provides a combination and method comprising saflufenacil, metamitron, and oryzalin.

An embodiment of the present invention provides a combination and method comprising saflufenacil, metamitron and pendimethalin.

An embodiment of the present invention provides a combination and method comprising saflufenacil, metribuzin and oryzalin.

An embodiment of the present invention provides a combination and method comprising saflufenacil, metribuzin, and pendimethalin.

An embodiment of the present invention provides a combination and method comprising saflufenacil, carfentrazone, and oryzalin.

An embodiment of the present invention provides a combination and method comprising saflufenacil, carfentrazone, and pendimethalin.

An embodiment of the present invention provides a combination and method comprising saflufenacil, flucarbazone, and oryzalin.

An embodiment of the present invention provides a combination and method comprising saflufenacil, flucarbazone, and pendimethalin.

An embodiment of the present invention provides a combination and method comprising saflufenacil, sulfentrazone and oryzalin.

An embodiment of the present invention provides a combination and method comprising saflufenacil, sulfentrazone and pendimethalin.

An embodiment of the present invention provides a combination and method comprising saflufenacil, penoxsulam, and oryzalin.

An embodiment of the present invention provides a combination and method comprising saflufenacil, penoxsulam and pendimethalin.

These combinations may be applied to the locus of the weeds, in an herbicidally effective amount.

In an embodiment, the combination of the present invention may be combined with at least one other active such as those selected from but not limited to herbicide, insecticide, fungicide, biological agent, plant growth activator, fertilizers or combinations thereof.

Thus, in an embodiment, the combination of the present invention may be combined with a herbicide. Exemplary herbicides that may be combined with the combination of the present invention may be selected from but not limited to herbicides belonging to classes such as ACCase inhibitors, ALS inhibitors, EPSP synthase inhibitors, synthetic auxins, auxin transport inhibitors, glutamate synthase inhibitors, HPPD inhibitors, lipid synthesis inhibitors, long chain fatty acid inhibitors, as well as herbicides with unknown modes of action.

In an embodiment, the total amount of saflufenacil in the composition may typically be in the range of 6.1 to 99% by weight, preferably 0.2 to 90% by weight. The total amount of pendimethalin in the composition may be in the range of 0.1 to 99% by weight. The total amount of metribuzin in the composition may be in the of 0.1 to 99% by weight.

In an embodiment, the constituent herbicides of the combination of the present invention may be admixed in ratio of (1-80):(1-80):(1-80) of saflufenacil, pendimethalin and metribuzin respectively.

The herbicidal combination of the present invention may be used to target weeds among the crops such corn, rice, wheat, barley, rye, oat, sorghum, cotton, soybean, peanut, buckwheat, beet, rapeseed, sunflower, sugar cane, tobacco, etc.; vegetables; solanaceous vegetables such as eggplant, tomato, pimento, popper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as Perilla frutescens, mint, basil, etc. strawberry, sweet potato, Dioscorea japonica, colocasia, etc., flowers, foliage plants, turf grasses, fruits; pome fruits such apple, pear, quince, etc. stone fleshy fruits such as peach, plum, nectarine, Prunus mume, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, Eucalyptus, Ginkgo biloba, lilac, maple, Quercus, poplar, Judas tree, liquidambar formosana, plane tree, zelkova. Japanese arborvitae, fir wood, hemlock, juniper, Pinus, Picea, and Taxus cuspidate, etc.

In an aspect, the present invention may provide synergistic compositions of saflufenacil, pendimethalin and metribuzin.

In an embodiment, the composition of the present invention may contain agriculturally acceptable adjuvants, carriers, diluents, emulsifiers, fillers, anti-foaming agents, thickening agents, anti-freezing agents, freezing agents etc. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided as a pre-mix or tank mixed.

Suitable agricultural adjuvants and earners may include, but are not limited to crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; C9-C11 alkylpolyglycoside; phosphated alcohol ethoxylate; natural primary alcohol (C12-C16) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG(400) dioleate-99, alkyl sulfates, such as diethanolammonium lauryl sulfate; alkylarylsulfonate salts, such as calcium dodecylbenzenesulfonate: alkylphenol-alkylene oxide addition products, such as nonylphenol-$C_{16}$ ethoxylate; alcohol-alkylene oxide addition products, such as tridecyl alcohol-$C_{16}$ ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethythexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Suitable liquid carriers that may be employed in a composition of the present invention may include water or organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric; trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine; N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieseiguhr, chalk, diatomaceous earth, lime, calcium carbonate, bentonite, clay, Fuller's earth, talc, cottonseed hulls, wheat flour; soybean flour, pumice, wood flour, walnut shell flour, lignin, cellulose etc.

In an aspect, the present invention may provide methods of controlling weeds at a locus, said method comprising application of a synergistic combination of saflufenacil, pendimethalin, and metribuzin.

Thus, embodiments of the present invention may provide, method of controlling weeds at a locus, said method comprising application of synergistic combinations of saflufenacil, pendimethalin, Metribuzin and optionally a fourth active.

In an embodiment, the fourth active, may selected from herbicide, insecticide, fungicide, biological agent, plant growth activator, fertilizers or combinations thereof.

The target weeds may be selected from Alopecurus myosuroides Huds, (blackgrass, ALOMY), Amaranthus palmeri (Palmer amaranth, AMAPA) Amaranthus viridis (slender amaranth, AMAVI), Avena fatua (wild oat, AVEFA), Brachiaria decumbens Stapf, or Urochloa decumbens (Stapf), Brachiaria brizantha or Urochloa brizantha, Brachiaria platyphylla (Groseb.) Nash or Urochloa platyphylla (broadleaf signalgrass, BRAPP), Brachiaria plantaginea, or Urochloa plantaginea (alexandergrass, BRAPL), Cenchrus echinatus (southern sandbar, CENEC), Digitaria horizontalis Willd. (Jamaican crabgrass, DIGHO), Digitaria insularis (sourgrass, TRCIN), Digitaria sanguinalis (large crabgrass, DIGSA), Echinochloa crus-galli (barnyardgrass, ECHCG), Echinochloa colonum (junglerice, ECHCO), Eleusine indica Gaertn. (goosegrass, ELEIN), Lolium multiflorum Lam. (Italian ryegrass, LOLMU), Panicum dichlotomiflorum Michx. (fall panicum, PANDI), Panicurn miliaceum L. (wild-proso millet, PANMI), Sesbania exaltata (hemp sesbania, SEBEX), Setaria faberi Herrm. (giant foxtail, SETFA), Setaria viridis (green foxtail, SETVI), Sorghum halepense (Johnsongrass, SORHA), Sorghum bicolor, Moench ssp., Arundinaceum (shattercane, SORVU), Cyperus esculentus (yellow nutsedge, CYPES), Cyperus rotundus (purple nutsedge, CYPRO), Abutilon theophrasti (velvetleaf, ABUTH), Amaranthus species (pigweeds and amaranths, AMASS), Ambrosia artemislifolia L. (common ragweed, AMBEL), Ambrosia psilostachya DC. (western ragweed, AMBPS), Ambrosia trifida (giant ragweed, AMBTR), Arioda aristata (spurred anoda, ANVCR), Asclepias syriaca (common milkweed, ASCSY), Bidens pilosa (hairy beggarticks, BIDPI), Borreria species (BOISS), Borreria alata or Spermacoce alata Aubl. or Spermacoce latifolia (broadleaf buttonweed, BOILF), Chenopodium album L. (common lambsquarters, CHEAL), Cirsium arvense (Canada thistle, CIRAR), Commelina benghalensis (tropical spiderwort, COMBE), Datura stramonium (jimsonweed, DATST), Daucus carota (wild carrot, DAUCA), Euphorbia heterophylla (wild poinsettia, EPHHL), Euphorbia hirta or Chamaesyce hirta (garden spurge, EPHHI), Euphorbia dentata Michx. (toothed spurge, EPHDE), Erigeron bonariensis or Conyza bonariensis (hairy fleabane, ERIBO), Erigeron canadensis or Conyza canaderisis (horseweed, ERICA), Conyza sumatrensis (tall fleabane, ERIFL), Helianthus annuus (common sunflower, HELAN), Jacquemontia tamnifolia (smallflower morningglory, IAQTA), Ipomoea hederacea (ivyleaf morningglory, IPOHE), Ipomoea lacunosa (white morningglory, IPOLA), Lactuca serriola (prickly lettuce, LACSE), Portulaca oleracoa (common purslane, POROL), Richardia species (pusley, RCHSS), Salsola tragus (Russian thistle, SASKR), Sida species (sida, SIDSS), Sida spinosa (prickly sida, SIDSP), Sinapis arvensis (wild mustard, SINAR), Solanum ptychanthum (eastern black nightshade, SOLPT), Tridax procumbens (coat buttons, TRQPR), or Xanthium strumarium (common cocklebur, XANST).

In an embodiment, the combinations of the present invention may be applied to the locus either simultaneously or sequentially, such that saflufenacil, first herbicide and second herbicide may be applied in a tank mix or as a pre-mixed composition.

In an embodiment, the present invention may be applied either pre or post emergent. The advantage of the combination is surprisingly good residual effects, when applied in pre-emergent as well as quick knockdown when applied post emergent leading to quick control of weeds. In another embodiment, the present invention may be applied for quick burndown of weeds. Another advantage is quick knockdown in the case of burndown.

The method of control of the present invention may be carried out by spraying the suggested tank mixes, or the individual herbicides may be formulated as a kit-of-parts containing various components that may be mixed as instructed prior to spraying.

In an embodiment, the components of the present invention may be packaged such that saflufenacil, the first herbicide and the second herbicide may be packaged separately and then tank mixed before the spraying.

In another embodiment, the components of the present invention may be packaged such that saflufenacil, the first herbicide and the second herbicide may be packaged separately, whereas other additives are packaged separately, such that the two may be tank mixed at the time of spraying.

In another embodiment, the components of the present invention may be packaged as composition such that saflufenacil, the first herbicide and the second herbicide are formulated into one composition and other additives are packaged separately, such that the two may be tank mixed at the time of spraying.

Surprisingly, it has been found by the present inventors, that saflufenacil, the first herbicide and the second herbicide of the present invention, when applied individually, was ineffective in the control of weeds, but demonstrated excellent synergistic control on when applied together. The combination controlled the weed both pre and post emergently. As will be demonstrated by the examples, the combination of saflufenacil, the first herbicide and the second herbicide synergistically controlled broadleaf as well as grasses and sedges at a locus. The current invention therefore provides advantageous methods of controlling weeds both pre and post emergently. The present method also provides a broader spectrum of controlling weeds that helps in resistance management, thus preventing the weed from becoming resistant to either of the herbicides whist providing a broader spectrum of control at lower use rates.

EXAMPLES

Studies were conducted to compare the weed controlling activity of the combination of saflufenacil, a triazine herbicide and pendimethalin. When compared, the observed efficacy with the "expected" efficacy it was found that saflufenacil and a triazine herbicide such as metribuzin and pendimethalin showed exceptional synergy. Any difference between the observed and "expected" efficacy could be attributed to synergy between the compounds in the control of a broad spectrum of weeds. The expected efficacy of a combination of saflufenacil, a triazine herbicide and an pendimethalin was calculated using the well-established Colby method.

In the Colby method, the expected (or predicted) response of a combination of herbicides is calculated by taking the product of the observed response for each individual component of the combination when applied alone divided by 100 and subtracting this value from the sum of the observed response for each component when applied alone. An unexpected enhancement in efficacy of the combination is then determined by comparing the observed response of the combination to the expected (or predicted) response as calculated from the observed response of each Individual component alone. If the observed response of the combination is greater than the expected (or predicted) response, or stated conversely, if the difference between the observed and expected response is greater than zero, then the combination is said to be synergistic or unexpectedly effective. (Colby, S. R., Weeds, 1967(15), p. 20-22) The Colby method requires only a single dose of each herbicide applied alone and the mixture of both doses.

The weed control activity of the individual herbicides of the invention and their combinations were evaluated on weeds such as those belonging to *Echinochloa colona, Digitaria sanguinalis, Amaranthus viridis, Commelina benghalensis*, and *Cyperus rotundus*. The trial was carried out in Randomized Complete Block (RCB) method. Each trial was replicated four times and conducted under GEP guidelines. Application volumes were varied for each mixture. Such field trials were carried out at various locations so as to generate independent data, the locations were chosen randomly across India. Saflufenacil, metribuzin and pendimethalin were sprayed according to their recommended dosage.

The following formula was used to calculate the expected activity of mixtures containing three active ingredients, A, B and C:

$$\text{Expected}(E)\ A + B + C - \frac{(AB + AC + BC)}{100} + \frac{ABC}{10,000}$$

Where

A=observed efficacy of active ingredient A at the same concentration as used in the mixture.

B=observed efficacy of active ingredient B at the same concentration as used in the mixture.

C=observed efficacy of active ingredient C at the same concentration as Used in the mixture.

The herbicide tank mix combinations, application rates, plant species tested, and results are given in the following tables:

TABLE 1

Table 1 demonstrates synergy on weeds using the combination of saflufenacil, metribuzin and pendimethalin. The field trials were carried out in India at various locations. The percentage efficacy was calculated after 15 days of applications, The target weeds were grass weeds end the concentration of the herbicide was and the results are recorded in the tables 1 below:

| Active | Dose Rate Unit g ai/ha | Echinochloa colona | | Eleucine indica | | Digitaria sanguinalis | |
|---|---|---|---|---|---|---|---|
| | | Expected | Actual | Expected | Actual | Expected | Actual |
| Saflufenacil | 140 | | 8.3 | | 13.3 | | 56.7 |
| Metribuzin | 1150 | | 6.7 | | 8.3 | | 13.3 |
| Pendimethalin | 500 | | 58.3 | | 46.7 | | 56.7 |
| Saflufenacil + Metribuzin + Pendimethalin | 112 + 920 + 571 | 63.99 | 96 | 56.9 | 93.7 | 79.6 | 93.3 |
| Observed - Expected efficacy | | | 32 | | 13.02 | | 13.7 |

The results in table 1 clearly demonstrates synergy between saflufenacil, traizine herbicide metribuzin and pendimethalin in weeds. The large difference between the observed and the expected efficacy clearly demonstrates the synergistic effect of the combination,

TABLE 2

Table 2 demonstrates synergy on weeds using the combination of saflufenacil metribuzin and pendimethalin using a different ratio of actives on grasses for burndown. The percentage efficacy was calculated after 15 days of applications. The results are recorded in the tables 2 below:

| Active | Dose Rate Unit g ai/ha | Echinochloa colona | | Eleucine indica | | Digitaria sanguinalis | |
|---|---|---|---|---|---|---|---|
| | | Expected | Actual | Expected | Actual | Expected | Actual |
| Saflufenacil | 140 | | 8.3 | | 13.3 | | 56.7 |
| Metribuzin | 1150 | | 6.7 | | 8.3 | | 13.3 |
| Pendimethalin | 500 | | 58.3 | | 46.7 | | 56.7 |
| Saflufenacil + Metribuzin + Pendimethalin | 140 + 1150 + 500 | 63.99 | 95.7 | 56.9 | 94 | 79.6 | 94.7 |
| Observed - Expected efficacy | | | 31.71 | | 37.1 | | 15.1 |

The results in table 2 clearly demonstrates synergy between saflufenacil, metribuzin and pendimethalin in controlling various weeds. The large difference between the observed and the expected efficacy clearly demonstrates the synergistic effect of the combination.

TABLE 3

Table 3 demonstrates synergy on weeds using the combination of saflufenacil metribuzin and pendimethalin using a different ratio of actives on grasses for burndown. The percentage efficacy was calculated after 30 days of applications. The results are recorded in the tables 3 below:

| Dose | | % Weed control Burn Down Symptoms Generation on different grasses at 30 DAA | | | | | |
|---|---|---|---|---|---|---|---|
| | Rate | *Echinochloa colona* | | *Eleucine indica* | | *Digitaria sanguinalis* | |
| Active | Unit g ai/ha | Expected | Actual | Expected | Actual | Expected | Actual |
| Saflufenacil | 140 | | 13 | | 9.3 | | 13.3 |
| Metribuzin | 1150 | | 10 | | 5.7 | | 10 |
| Pendimethalin | 500 | | 53.3 | | 45 | | 50 |
| Saflufenacil + Metribuzin + Pendimethalin | 140 + 1150 + 500 | 76.9 | 95.7 | 60.19 | 95 | 73.5 | 94.3 |
| Observed - Expected efficacy | | | 18.08 | | 34 | | 21.42 |

The results in table 3 clearly demonstrates synergy between saflufenacil, metribuzin and pendimethalin in controlling various weeds. The large difference between the observed and the expected efficacy clearly demonstrates the synergistic effect of the combination.

TABLE 4

Table 4 demonstrates synergy on weeds using the combination of saflufenacil metribuzin and pendimethalin using a different ratio of actives on grasses for burndown. The percentage efficacy was calculated after 30 days of applications. The results are recorded in the tables 4 below:

| Dose | | % Weed control Burn Down Symptoms Generation on different grasses at 30 DAA | | | | | |
|---|---|---|---|---|---|---|---|
| | Rate | *Echinochloa colona* | | *Eleucine indica* | | *Digitaria sanguinalis* | |
| Active | Unit g ai/ha | Expected | Actual | Expected | Actual | Expected | Actual |
| Saflufenacil | 140 | | 13 | | 9.3 | | 13.3 |
| Metribuzin | 1150 | | 10 | | 5.7 | | 10 |
| Pendimethalin | 500 | | 53.3 | | 45 | | 50 |
| Saflufenacil + Metribuzin + Pendimethalin | 140 + 1150 + 500 | 76.9 | 95.7 | 60.19 | 95 | 73.5 | 94.3 |
| Observed - Expected efficacy | | | 18.08 | | 34 | | 21.42 |

The results in table 4 clearly demonstrates synergy between saflufenacil, metribuzin and pendimethalin in controlling various weeds. The large difference between the observed and the expected efficacy clearly demonstrates the synergistic effect of the combination.

TABLE 5

Table 5 demonstrates synergy on weeds using the combination of saflufenacil metribuzin and pendimethalin using a different ratio of actives on sedges for burndown. The percentage efficacy was calculated after 15 and 30 days of applications. The results are recorded in the tables 5 below:

| Active | Rate Unit g ai/ha | Dose % Weed control Burn Down Symptoms Generation on different grasses | | | |
|---|---|---|---|---|---|
| | | Cyperus rotundus at 15 DAA | | Cyperus rotundus at 30 DAA | |
| | | Expected | Actual | Expected | Actual |
| Saflufenacil | 140 | | 15 | | 20 |
| Metribuzin | 1150 | | 6.7 | | 8.3 |
| Pendimethalin | 500 | | 31.7 | | 25 |
| Saflufenacil + Metribuzin + Pendimethalin | 112+ 920+ 571 | 52.95 | 61.7 | 53.64 | 63.3 |
| Observed - Expected efficacy | | 7.04 | | 9.65 | |

The results in table 5 clearly demonstrates synergy between saflufenacil, metribuzin and pendimethalin in controlling various weeds. The large difference between the observed and the expected efficacy clearly demonstrates the synergistic effect of the combination.

TABLE 6

Table 6 demonstrates synergy on weeds using the combination of saflufenacil metribuzin and pendimethalin using a different ratio of actives on broadleaf weeds for burndown. The percentage efficacy was calculated after 15 and 30 days of applications. The results are recorded in the tables 6 below:

| Active | Rate Unit g ai/ha | Dose % Weed control Burn Down Symptoms Generation on different grasses | | | |
|---|---|---|---|---|---|
| | | Digera sp. at 15 DAA | | Digera sp. at 30 DAA | |
| | | Expected | Actual | Expected | Actual |
| Saflufenacil | 140 | | 69.7 | | 68.3 |
| Metribuzin | 1150 | | 8.3 | | 8.3 |
| Pendimethalin | 500 | | 66.7 | | 7.0 |
| Saflufenacil + Metribuzin + Pendimethalin | 112+ 920+ 571 | 86.88 | 95.9 | 87.61 | 95.3 |
| Observed - Expected efficacy | | 9.02 | | 7.69 | |

The results in table 6 clearly demonstrates synergy between saflufenacil, metribuzin and pendimethalin in controlling various weeds. The large difference between the observed and the expected efficacy clearly demonstrates the synergistic effect of the combination.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A herbicidal composition comprising:
   herbicidal active ingredient combination consisting of
   a. saflufenacil;
   b. at least one triazinone herbicide selected from the group consisting of ametridione, amibuzin, ethiozin, hexazinone, isomethiozin, metamitron, metribuzin, and trifludimoxazin; and
   c. at least one dinitroaniline herbicide selected from the group consisting of benfluralin, butralin, chlornidine, dinitramine, dipropalin, ethalfluralin, fluchloralin, isopropalin, nitralin, oryzalin, pendimethalin, prodiamine, profluralin, and trifluralin, and
   at least one inert ingredient selected from the group consisting of an adjuvant, a carrier, a diluent, an emulsifier, a filler, an anti-foaming agent, a thickening agent, an anti-freezing agent, and a freezing agent.

2. The herbicidal composition as claimed in claim 1, wherein, the composition is a solid or liquid formulation.

3. The herbicidal composition as claimed in claim 1, wherein the herbicidal active ingredient combination consists of:
   (i) saflufenacil, hexazinone, and oryzalin;
   (ii) saflufenacil, hexazinone, and pendimethalin;
   (iii) saflufenacil, metamitron, and oryzalin;
   (iv) saflufenacil, metamitron, and pendimethalin;
   (v) saflufenacil, metribuzin, and oryzalin; or
   (vi) saflufenacil, metribuzin, and pendimethalin.

* * * * *